United States Patent
Palaniappan

(10) Patent No.: US 6,964,051 B1
(45) Date of Patent: Nov. 8, 2005

(54) ENABLING AND DISABLING REMOTE FEATURES DYNAMICALLY IN SOFTWARE APPLICATIONS

(75) Inventor: Murugappan Palaniappan, Issaquah, WA (US)

(73) Assignee: Adobe Systems Incorporated, San Jose, CA (US)

( * ) Notice: Subject to any disclaimer, the term of this patent is extended or adjusted under 35 U.S.C. 154(b) by 662 days.

(21) Appl. No.: 10/054,472

(22) Filed: Jan. 18, 2002

(51) Int. Cl.$^7$ ................................................ G06F 9/54
(52) U.S. Cl. ................ 719/317; 709/202; 709/223; 715/746
(58) Field of Search ................ 719/317, 313; 709/202, 223–226, 229; 715/708, 744, 745, 746, 747, 750

(56) References Cited

U.S. PATENT DOCUMENTS

| | | | | |
|---|---|---|---|---|
| 5,212,770 A | * | 5/1993 | Smith et al. ................ | 715/746 |
| 5,247,614 A | * | 9/1993 | Eagen et al. ................ | 709/203 |
| 5,341,477 A | * | 8/1994 | Pitkin et al. ................ | 709/226 |
| 5,446,896 A | * | 8/1995 | Hegarty et al. ............. | 707/1 |
| 5,481,710 A | * | 1/1996 | Keane et al. ............... | 719/320 |
| 5,596,702 A | * | 1/1997 | Stucka et al. .............. | 715/746 |
| 6,016,504 A | * | 1/2000 | Arnold et al. .............. | 709/200 |
| 6,732,181 B2 | * | 5/2004 | Lim et al. ................... | 709/229 |
| 6,799,198 B1 | * | 9/2004 | Huboi et al. ............... | 709/203 |
| 6,807,181 B1 | * | 10/2004 | Weschler .................... | 370/400 |

* cited by examiner

Primary Examiner—Lewis A. Bullock, Jr.
(74) Attorney, Agent, or Firm—Fish & Richardson P.C.

(57) ABSTRACT

Methods and apparatus, including computer program products, implementing technology that allows two or more computer program applications on a client computer to learn about the availability and use of remote features through a shared component that uses information obtained from a remote server but maintained locally.

31 Claims, 3 Drawing Sheets

ENABLING AND DISABLING REMOTE FEATURES DYNAMICALLY IN SOFTWARE APPLICATIONS

BACKGROUND

This invention relates to enabling or disabling remote features on a client computer.

Computer program applications running on a client computer may contain internal hooks enabling a user to access and download components, for example, through the Internet from a web site (i.e., a site on the World Wide Web). In some applications, certain conditions will trigger a hook, providing the user with the option of accessing and downloading information.

Consider as an example, a user of the application receives a document with a font (Font X) that is not available on the user's computer. When the user attempts to print the document, the user may receive a dialog display with the following message:

Font X is not available on your computer.
<BUY NOW>

If the user clicked on the "Buy Now" button, the user would be linked to a web site. If Font X was available on the web site, the user could purchase and download the font. If, however, Font X was not available on the web site, the user might receive a message indicating that the site was "under construction" or otherwise not operational. The "Buy Now" button is a hook added to the missing font dialog box and the programming associated with that button.

For this specification, a hook is a software feature included in an application in order to facilitate the implementation of a feature, which will be referred to as a remote feature, that requires the use or availability of data or programming, e.g., a web page, that is resident remote from the machine executing the application.

In current practice, such hooks (i.e., these calls to access the remote aspects of the remote features, for example by calling into a web site) are visible to the user, for example, in the form of a button or menu. The hooks are designed into the code when the software is written. A designer may choose to include only hooks for features available at the time of coding, or may also include hooks for features that will be available in the future. If the designer includes hooks for future remote features, the user, when attempting to access a remote feature, may receive a message indicating that the feature is not currently available. A similar message may be displayed if a remote feature has been disabled.

The use of hooks is advantageous because the hooks allow the remote features available to a user application to be updated dynamically. Hooks also allow an application to be implemented to provide goods, services or information (for a fee or at no cost) from one or more remote locations such as web sites. Hooks allow traditional software applications to contain a dynamic component. One disadvantage of visible hooks, however, is that the user interface provides the user with the option of accessing remote features that may not be available (either because the feature is not fully developed or because the remote feature is disabled). One known way of avoiding presenting a user with a remote feature that is not available is to design hooks only for remote features available at the time of programming. A disadvantage of this approach is that in order to add or delete remote features, the application software must be updated.

SUMMARY

The invention provides technology that allows two or more computer program applications on a client computer to learn about the availability and use of remote features through a shared component that uses information obtained from a remote server but maintained locally.

In general, in one aspect, the invention features a computer program product having instructions for a client computer to interact with one or more functionality servers remote from the client computer to obtain, and to maintain locally on the client computer, control information specifying the availability of each of a set of one or more remote features; and instructions for a shared component for multiple distinct applications, the shared component being operable to cause the shared component (i) to receive requests for one or more particular remote features from two or more applications, and (ii) to use the obtained control information to respond to each request with either (a) information indicating that the requested remote feature should be treated as unavailable, or (b) information indicating that the requested remote feature should be treated as available. A remote feature is a feature that requires, for proper operation in an application that invokes the feature, a resource external to the application.

In general, in another aspect, the invention features a system for dynamically enabling remote features in computer program applications. The system includes one or more functionality servers that can communicate with a remote client computer. Each functionality server maintains control information concerning one or more remote features. The system also includes a monitoring process running on the client computer that maintains a local cache copy of the control information by periodic synchronization with one or more of the functionality servers. The system also includes a feature-enabling process configured to execute in each of two or more distinct computer program applications, which applications have user interface hooks for the one or more remote features. The feature-enabling process can use the control information maintained in the cache copy to determine whether to treat a particular remote feature as being available before the application provides a user an option of invoking the particular remote feature through a corresponding user interface hook.

In general, in a further aspect, the invention features apparatus configured to communicate with one or more remote servers. The apparatus includes a client computer and a shared component installed on the client computer and accessible by one or more applications installed on the client computer. The shared component can interact with the one or more functionality servers to obtain, and to maintain locally on the client computer, control information specifying the availability of each of a set of one or more remote features; and to operate as a shared component with multiple distinct applications, (i) to receive requests for one or more particular remote features from two or more applications, and (ii) use the obtained control information to respond to each request with either (a) information indicating that the requested remote feature should be treated as unavailable, or (b) information indicating that the requested remote feature should be treated as available.

The invention can be implemented to realize one or more of the following advantages. Visible hooks are provided only for remote features determined, during a recent synchronization, to be available. Therefore, a programmer is enabled to build in hooks for features not yet available and to hide those hooks until the feature becomes available. Hooks for features once available, but later disabled, can also be hidden. Thus, a user is presented only with hooks for remote features determined to be available. In addition, a remote feature that is shared by multiple applications can be enabled and disabled in one place, through a common information source and a shared program component.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
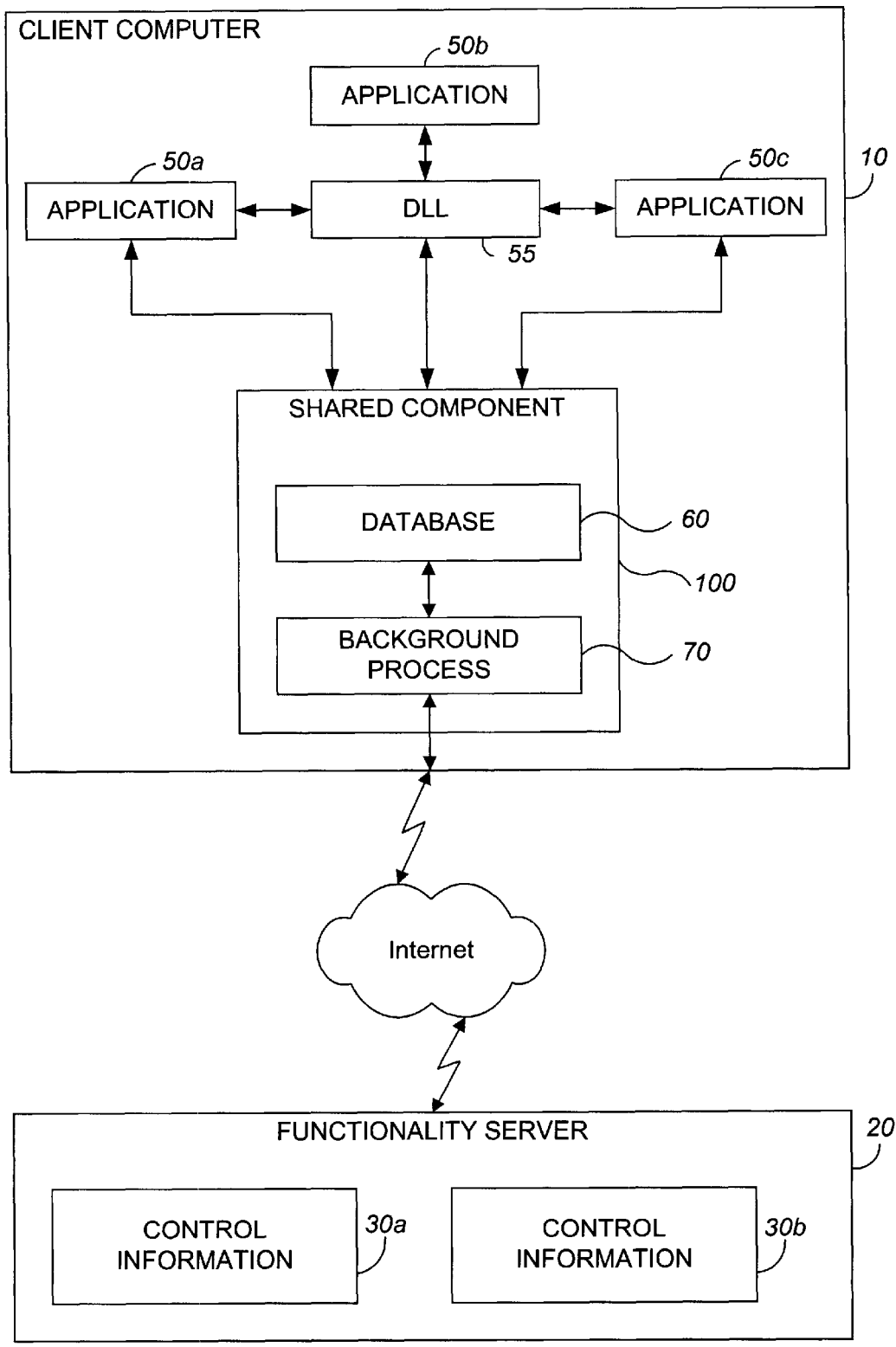
FIG. 1 illustrates the relationship between applications, a client computer, and a functionality server in accordance with one aspect of the invention.

As shown in FIG. 1, one or more applications 50 (shown as 50a, 50b, 50c) are installed on client computer 10. In the implementation for applications running under a Microsoft® Windows operating system that will now be described, each application 50 is linked to a dynamic link library (DLL) 55, which DLL provides a shared library of code and data that may be linked to the multiple applications 50. The DLL 55 can be shared by multiple instances of the applications 50 simultaneously and provides the applications' link to, and can be considered part of, the shared component 100, which will be described. In other implementations, other technologies for implementing the processes described below will be used. Each application 50 registers itself with an application-independent shared component 100. This component contains or maintains a database 60 and runs a background process 70 on the client computer. In one implementation, the database 60 is simply a data file that stores information in Extensible Markup Language (XML) format. This can be accessed and manipulated by the application through a Document Object Model (DOM) interface. However, information may be stored and maintained using a database management system or any other convenient technology. The database 60 may be stored on any non-volatile memory local to the client computer 10, such as on a disk drive directly connected to the client computer 10 or on a disk drive that is local to the client computer 10, for example, a disk drive in a server coupled to the client computer 10 by a local area network. For speed of access, it is advantageous that a copy or extract be maintained in random access memory.

The background process 70 is a process that runs separately from any application 50. It is convenient to start up the background process 70, either alone or with the shared component 100, when the client computer 10 is powered up; however, it can be started up at a later time, e.g., when an attempt is first made to access it. The background process 70 executes automatically and the applications 50 linked to it dynamically. When the operating system of the client computer 10 starts up, when an application 50 calls into the DLL 55, or when the DLL 55 calls into the background process 70 to register an application 50, the background process 70 wakes up. When the background process 70 has completed its processes, it terminates execution until it is next awoken.

In an alternative implementation, the functions of the background process are performed by a separate thread running, for example, in the DLL 55.

An application 50 registers with the shared component 100 and provides information identifying the application 50 and optionally identifying the language of the application (such as English or French), the application program version, the platform (such as Windows 98®), the location on the client computer 10 of the one or more components of the application, and remote features supported by the application. The shared component 100 stores the registration information in its database 60.

The shared component 100 also interacts with one or more functionality servers 20 that provide functionality or control information related to remote features. A functionality server can be implemented as a server accessible through the Internet, for example, a web or FTP (File Transfer Protocol) server, to provide control information in the form of web pages, XML documents, objects, or data in other formats, as will be described. The shared component 100 keeps its copy of control information (collectively 30) current by accessing, or synchronizing with, one or more functionality servers 20 periodically (for example, once a week) to download the control information 30. The control information 30 is optionally stored on a functionality server 20 in Extensible Markup Language (XML) format, with tags giving meaning to the control information 30, or in another extensible self-describing file format.

The periodic access or synchronization can be implemented to occur automatically, in response to a user action, or both. The event that wakes up the background process 70 can be the passage of a time interval or some other occurrence. The time interval can be a default value or set by a user, for example, once a week or at a particular time on a particular day of the week.

The shared component 100 can optionally be configured to obtain all the control information 30 available on a functionality server, or only the control information 30 relevant to the applications registered with the shared component. The shared component 100 can optionally be configured to obtain only information that updates information previously obtained.

The control information 30 indicates the availability of remote features. If the control information 30 as of the last synchronization indicates that a particular features is available, that feature should be treated as available for the purposes of determining which features to offer to a user. If a feature is treated as available, a user will be presented with a visible hook enabling the user to access the feature. If a feature is treated is unavailable, the hook will not be displayed to the user.

A functionality server will have control information for multiple applications and remote features, and remote features will be shared by multiple applications. The control information 30 includes metadata relating to remote features; a particular implementation may include, for example, links to web sites hosting particular remote features as well as information specifying the availability of particular remote features. Programming and data for remote features may be served from any accessible server or from the functionality server itself. A remote feature may be a web connectivity or web-based feature; i.e., a feature of an application that requires remote web-resident resources for the correct operation of the feature, which resources may or may not be available at any particular time. Examples of such resources include any component of an application, such as content or code, an electronic document, a single file, or a package of files. For example, a remote resource might be or include a library, an installer, a markup language file, a graphics file, a help file, or a tutorial file.

In one implementation, the background process 70 downloads all available control information 30 for remote features, regardless of which features are supported by the registered applications. In an alternative implementation, the background process 70 uses the application registration information is selective, downloading only control information 30 for remote features supported by the registered applications.

The shared component 100 can be implemented to make itself available to a user of an application by adding a command to a menu, such as the help menu of the application. Selecting the command causes a user interface window to open through which the user may select remote features that are dynamically enabled as described in more detail below.

Figure 2:
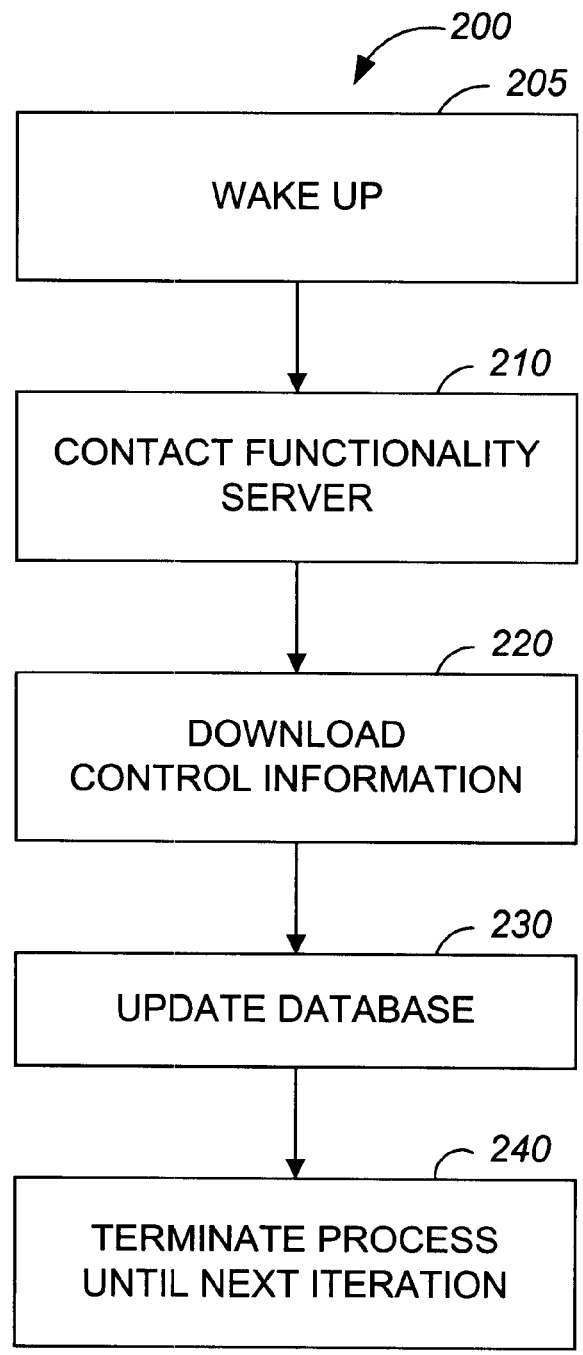
FIG. 2 is a flow diagram illustrating a process for synchronizing control information.

As shown in FIG. 2, the background process on the client computer wakes up periodically (205), as has been described, and performs a synchronization procedure 200 that contacts a functionality server (or some substitute, such as a mirror site) over the Internet (210). The background process downloads control information (220) from the functionality server. In one implementation, the control information is meta-information downloaded in the form of an XML file that contains remote feature availability information as well as information as to the location of any remote resources used by the remote features.

The background process updates its database, overwriting previously saved control information with the current control information (230). In one implementation, the background process terminates (240) after the database is updated. In an alternative implementation, before the background process terminates, the control information downloaded during the last synchronization is compared with the current control information, and the process determines whether any remote features have been added or disabled since the last synchronization. The background process notifies the running registered applications affected by any such change before terminating; an application that is not running will ask for the information the next time it is run.

Figure 3:
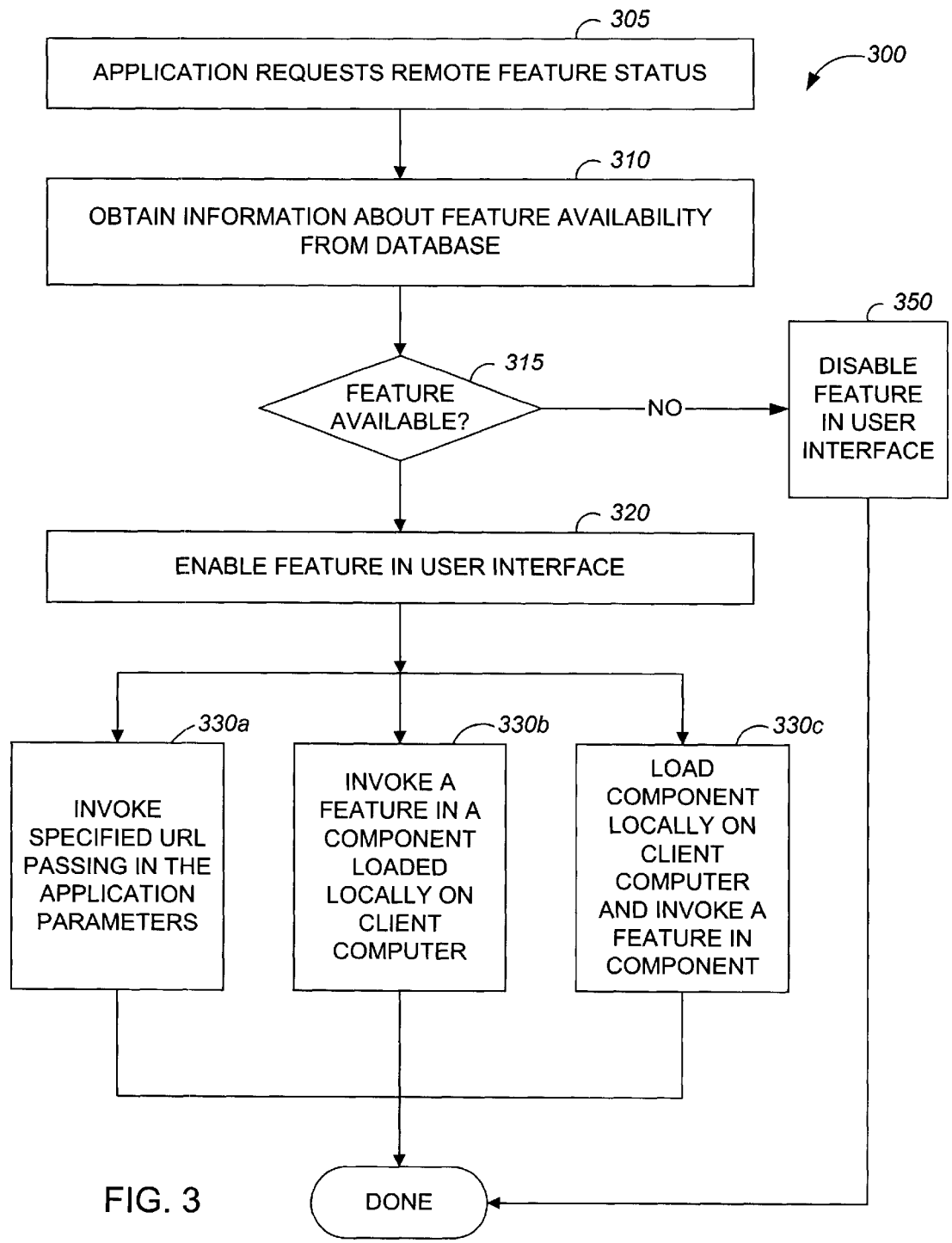
FIG. 3 is a flow diagram illustrating a process for enabling a feature in a user interface.

As shown in FIG. 3, in one implementation, when an application requests the status of a remote feature (305), the shared component determines whether the remote feature is available (310). If it is not ("no" branch from decision step 315), the application disables the feature so it does not appear in the user interface (350). If it is ("yes" branch from decision step 315), the application, the feature is made available to the user on the user interface (320) and the application obtains from the shared component any available information about the feature, which the shared component provides from its database or an in memory copy or extract. Depending on the remote feature, this information might indicate that if the user requests the remote feature, the application should invoke a specified URL passing in the application parameters (330a), invoke a feature in a component loaded locally on the client computer (330b), or load a component locally on the client computer and invoke a feature in the component (330c). Optionally, the application can obtain this further information in every case, and preload a missing component, for example, or only in case the user invokes the remote feature in the user interface.

Thus, the control information can be used to supply information to an application specifying what action to take to invoke a remote feature. For example, this information may be information specifying that an identified component is to be downloaded from a web site and invoked at specified entry points, that a remote feature loaded in the shared component is to be invoked at specified entry points, or that a web server script should be invoked with particular data.

Depending on the remote feature, the enabling process may involve placing remote feature files in an appropriate local application program file directory, for example, or running an installer program or performing some other installation process to install the remote feature. Optionally, if the enabling process downloads an installer, the enabling process can tell the background process to launch the installer, which may shut down the enabling process, do the installation, and then restart the enabling process.

The following table shows an illustrative portion of an XML file containing control information downloaded periodically by a shared component in one implementation.

<fontpurchase>
<url HREF="http://cgi1.adobe.com/general/feedback.cgi?conf=typedownload&"/>
</fontpurchase>

In the particular implementation now being described, a single XML file contains all the control information 30 provided by a software company for its applications. In this implementation, the file can have an XML section that corresponds to each available application, language, version, and hook, which in this case is represented by a unique hook number. By convention, a specific hook number will always refer to the same remote feature. The XML file is cached by the shared component. From this information, the shared component or an application registered with the shared component can determine, for any hook number, whether the corresponding remote feature should be enabled or disabled for a particular application, version, and language.

In this particular implementation, the shared component, in response to a call from an application, reads the XML section that corresponds to the application, language, version, and hook number (if one exists, or determines that none exists) and returns a behavior to the application through an established code structure. The application uses that information to determine whether or not a web feature needs to be enabled. If the feature is enabled, a subsequent action from the user on a button or other control provided for the remote feature causes the application to call the shared component with the application, language, version, and hook number information. The application then reads the same XML section for more information to determine what action to take. Examples of actions include sending the user to a web site at a specific URL, displaying user interface elements inside the shared component and populating them with information in the XML section such as displaying an animated GIF, and downloading another component identified in the XML file and after it is downloaded, loading it and invoking the specified entry points.

A software company that provides multiple applications can implement the invention in the following way. The company establishes a protocol in the XML section and establishes a data structure that is agreed upon for the shared component and the applications before they ship. When it executes, the shared component reads a set of remote features that have associated hook numbers from a master XML section. Because applications ship at different times, they may support one or more of these remote features. Any application referring to a specific hook number always refers to the same web feature. Each application registers itself with the shared component when the application starts up on a client machine, which in general will be a personal computer, personal digital assistant, or other programmable machine having some connectivity with the Internet or other communications network. The shared component synchronizes and caches the XML information periodically from a company functionality server site. It then uses the cached information to respond to the application for a requested hook number and application information. It is possible for a remote feature to be enabled for one application but not another.

The invention can be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits).

A number of embodiments of the invention have been described. Nevertheless, it will be understood that various modifications may be made without departing from the spirit and scope of the invention. For example, software may be downloaded by accessing an FTP site or a bulletin board service or by connecting to a server directly over the public switched telephone network instead of accessing a web site over the Internet. The client computer may be any digital electronic device configured for program installation and execution, including, by way of example, desktop and laptop personal computers, personal digital assistants, and web-enabled mobile telephones. Accordingly, other embodiments are within the scope of the following claims.

What is claimed is:

1. A computer program product, tangibly stored on a computer readable medium, comprising:
   instructions operable to execute on a client computer to interact with one or more functionality servers remote from the client computer to obtain, and to maintain locally on the client computer, control information specifying the availability of each of a set of one or more remote features, each remote feature being a feature that requires, for proper operation in an application that invokes the remote feature, a resource external to the application; and
   instructions operable to execute as a shared component on a client computer for multiple distinct applications, the instructions of the shared component being operable to cause the shared component (i) to receive requests for one or more particular remote features from two or more applications, and (ii) to use the obtained control information to respond to each request with either (a) information indicating that the requested remote feature should be treated as unavailable, or (b) information indicating that the requested remote feature should be treated as available;
   whereby each distinct application operating with the shared component can determine whether or not remote features should be enabled in a user interface provided by the application without the application having to access a remote server.

2. The product of claim 1, the instructions of the shared component being operable to cause the shared component to respond to the requests with information specifying to the requesting application what action to take to invoke the one or more requested remote features.

3. The product of claim 2, wherein the information specifying to the requesting application what action to take to invoke the requested remote feature comprises information specifying that an identified component is to be downloaded from a web server and invoked at specified entry points.

4. The product of claim 2, wherein the information specifying to the requesting application what action to take to invoke the requested remote feature comprises information specifying that the requested remote feature is loaded in the shared component and is to be invoked at specified entry points.

5. The product of claim 2, wherein the requested remote feature comprises information to invoke a web server script with real data.

6. The product of claim 1, wherein the shared component obtains information about the availability of the remote features and how to access the remote features from an XML (Extensible Markup Language) file obtained from a web server and stored locally on the client computer.

7. The product of claim 6, wherein the shared component includes a background process that periodically synchronizes its locally stored information with a downloaded XML file.

8. The product of claim 1, wherein the set of remote features comprises a remote feature requiring a resource from a web server.

9. The product of claim 1, the instructions of the shared component being operable to cause the shared component to register each distinct application using information provided by the application, including information identifying the application, a natural language in which the application communicates with human users, an application program version, and a reference to one or more of the features in the set of remote features, the one or more features supported by the application.

10. The product of claim 9, comprising instructions operable to cause the client computer to interact with the one or more functionality servers to gather only information on the remote features supported by applications registered with the shared component.

11. The product of claim 1, wherein one resource external to any application that invokes the remote feature is a web-based resource.

12. A system for dynamically enabling remote features in computer program applications, the system comprising:
   one or more functionality servers, each functionality server operable to communicate with a remote client computer, each functionality server maintaining control information concerning one or more remote features, each remote feature being a feature that requires, for proper operation in an application that runs on the client computer and that invokes the remote feature, a resource external to the application;

a monitoring process running on the client computer, the monitoring process maintaining a local cache copy of the control information by periodic synchronization with one or more of the functionality servers;

a feature-enabling process configured to execute in each of two or more distinct computer program applications, each application having user interface hooks for the one or more remote features, the feature-enabling process being operable to use the control information maintained in the cache copy to determine whether to treat a particular remote feature as being available before the application provides a user an option of invoking the particular remote feature through a corresponding user interface hook, whereby each application is operable to disable hooks for remote features determined by the feature-enabling process not be available.

13. The system of claim 12, wherein the interface hooks comprise a hook configured to direct a user to a remote web site.

14. The system of claim 12, further comprising a registration process running on the client computer, the registration process operable to receive registration information from, and thereby register, the two or more distinct computer program applications.

15. The system of claim 14, wherein, during periodic synchronization, the monitoring process downloads or receives control information only for computer program applications registered through the registration process.

16. The system of claim 12, wherein the feature-enabling process is configured to obtain information from the cache copy specifying that an individual component is to be downloaded from a web server and invoked at specific entry points.

17. The system of claim 12, wherein the feature-enabling process is configured to obtain information from the cache copy specifying that a remote feature loaded in the shared component is to be invoked at specified entry points.

18. The system of claim 12, wherein the feature-enabling process is configured to obtain information from the cache copy specifying that a link is to be made to an identified component on a web server and invoked at specified entry points.

19. The system of claim 12, wherein the determination as to whether a remote feature is available is made solely using control information updated as of a most recent synchronization.

20. The system of claim 12, wherein the resource external to any application that invokes the remote feature is a web-based resource.

21. Apparatus configured to communicate with one or more remote servers, the apparatus comprising:

a client computer;

a shared component installed on the client computer and accessible by one or more applications installed on the client computer, the shared component operable to:

interact with the one or more functionality servers to obtain, and to maintain locally on the client computer, control information specifying the availability of each of a set of one or more remote features, each remote feature being a feature that requires, for proper operation in an application that invokes the remote feature, a resource external to the application; and operate as a shared component with multiple distinct applications, (i) to receive requests for one or more particular remote features from two or more applications, and (ii) to use the obtained control information to respond to each request with either (a) information indicating that the requested remote feature should be treated as unavailable, or (b) information indicating that the requested remote feature should be treated as available;

whereby each distinct application operating with the shared component can determine whether or not remote features should be enabled in a user interface provided by the application without the application having to access a remote server.

22. The apparatus of claim 21, the shared component operable to respond to the requests with information specifying to the requesting application what action to take to invoke the one or more requested remote features.

23. The apparatus of claim 22, wherein the information specifying to the requesting application what action to take to invoke the requested remote feature comprises information specifying that an identified component is to be downloaded from a web server and invoked at specified entry points.

24. The apparatus of claim 22, wherein the information specifying to the requesting application what action to take to invoke the requested remote feature comprises information specifying that a remote feature loaded in the shared component is to be invoked at specified entry points.

25. The apparatus of claim 22, wherein the requested remote feature comprises information to invoke a web server script with real data.

26. The apparatus of claim 21, wherein the shared component is operable to obtain information about the availability of the remote features and how to access the remote features from an XML (Extensible Markup Language) file obtained from a web server and stored locally on the client computer.

27. The apparatus of claim 26, wherein the shared component includes a background process that periodically synchronizes its locally stored information with a downloaded XML file.

28. The apparatus of claim 21, wherein the set of remote features comprises remote features requiring resources from a web server.

29. The apparatus of claim 21, the shared component operable to register each distinct application using information provided by the application, including information identifying the application, a natural language in which the application communicates with human users, an application program version, and a reference to one or more of the features in the set of remote features, the one or more features supported by the application.

30. The apparatus of claim 29, the shared component operable to interact with the one or more functionality servers to gather only information on the one or more remote features supported by applications registering with the shared component.

31. The apparatus of claim 21, wherein one resource external to any application that invokes the remote feature is a web-based resource.

* * * * *